US010810571B2

(12) United States Patent
Todasco et al.

(10) Patent No.: US 10,810,571 B2
(45) Date of Patent: Oct. 20, 2020

(54) LOCATION-BASED DEVICE AND AUTHENTICATION SYSTEM

(71) Applicant: PAYPAL, Inc., San Jose, CA (US)

(72) Inventors: Michael Charles Todasco, Santa Clara, CA (US); Cheng Tian, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 725 days.

(21) Appl. No.: 15/292,952

(22) Filed: Oct. 13, 2016

(65) Prior Publication Data

US 2018/0108003 A1 Apr. 19, 2018

(51) Int. Cl.

| | |
|---|---|
| ***G06Q 20/32*** | (2012.01) |
| ***G06F 21/44*** | (2013.01) |
| ***G06Q 20/40*** | (2012.01) |
| ***H04L 29/06*** | (2006.01) |
| ***G06Q 20/38*** | (2012.01) |

(52) U.S. Cl.
CPC ....... *G06Q 20/3224* (2013.01); *G06Q 20/382* (2013.01); *G06Q 20/4014* (2013.01); *G06Q 20/4016* (2013.01); *H04L 63/107* (2013.01)

(58) Field of Classification Search
CPC ...... G06F 21/44; G06Q 20/32; G06Q 20/227; H04L 63/126
USPC ........................................................... 705/44
See application file for complete search history.

(56) References Cited

U.S. PATENT DOCUMENTS 8,321,527 B2 11/2012 Martin et al.
8,655,312 B2 * 2/2014 Stahlberg ............. H04L 63/126 455/410
8,972,589 B2 3/2015 Roese et al.
9,037,111 B2 * 5/2015 West ....................... G06F 21/44 455/411
9,156,125 B2 10/2015 Xue et al.
2011/0047075 A1 * 2/2011 Fourez .................. G06Q 20/32 705/44
2011/0238517 A1 9/2011 Ramalingam et al.
2012/0023226 A1 1/2012 Petersen et al.
2012/0209772 A1 8/2012 Nuzzi et al.
2013/0173470 A1 7/2013 Nuzzi et al.
2014/0297527 A1 10/2014 McLaughlin et al.
2014/0337232 A1 11/2014 Glasgo (Continued)

OTHER PUBLICATIONS

International Search Report and Written Opinion dated Nov. 30, 2017 issued in related PCT application No. PCT/US2017/054167 (16 pages).

*Primary Examiner* — Clifford B Madamba

(74) *Attorney, Agent, or Firm* — Haynes and Boone, LLP

(57) ABSTRACT

Systems and methods for device and payment management include detecting, through a first network, that a user device that is associated with a user is located at a trusted location. A first anticipated activity that is associated with the user is determined. The first anticipated activity identifies a first activity location that is different from the trusted location. A first device management configuration that is associated with the first anticipated activity. A first user device action to be performed on the on the user device at the trusted location is determined using the device management configuration. A first notification that causes the first user device action to be performed on the user device while the user device remains at the trusted location is sent to the user device through the first network.

20 Claims, 14 Drawing Sheets

(56) References Cited

U.S. PATENT DOCUMENTS

| | | | |
|---|---|---|---|
| 2014/0372762 | A1 | 12/2014 | Flautner et al. |
| 2015/0026056 | A1 | 1/2015 | Calman et al. |
| 2015/0030157 | A1 | 1/2015 | Segev et al. |
| 2015/0256973 | A1 | 9/2015 | Raounak |
| 2015/0379514 | A1* | 12/2015 | Poole .................. G06Q 20/227 705/44 |
| 2016/0021535 | A1 | 1/2016 | Tali et al. |
| 2016/0063495 | A1 | 3/2016 | Leger |
| 2016/0098992 | A1 | 4/2016 | Renard et al. |

* cited by examiner

LOCATION-BASED DEVICE AND AUTHENTICATION SYSTEM

BACKGROUND

The present disclosure generally relates to electronic authentication, and more particularly to a location-based device and authentication management system that manages devices and authentications based on the location of devices.

More and more consumers are conducting transactions, such as purchasing items and services, over electronic networks such as, for example, the Internet. Consumers routinely purchase products and services from merchants and individuals alike. The transactions may take place directly between a physical or on-line merchant or retailer and the consumer, and payment is typically made by entering credit card or other financial information. Transactions may also take place with the aid of an on-line or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why on-line and mobile purchases are growing very quickly.

Many public locations such as, for example, coffee shops, hotels, shopping malls, and airports offering free access to public networks, public networks become a convenient way for users to conduct transactions. However, public networks are often unsecured and, as such, are subject to security issues such as snooping. For example, login credentials of a first user that are required for making a payment using a payment account with a payment service provider may be sent from a mobile device of the first user to a payment service provider device using a public network, and those login credentials may be vulnerable to snooping by a second user, which may expose the payment account to unauthorized charges and other security risks.

Thus, there is a need for improvements to electronic security and authentication that addresses the issues detailed above.

Figure 1:
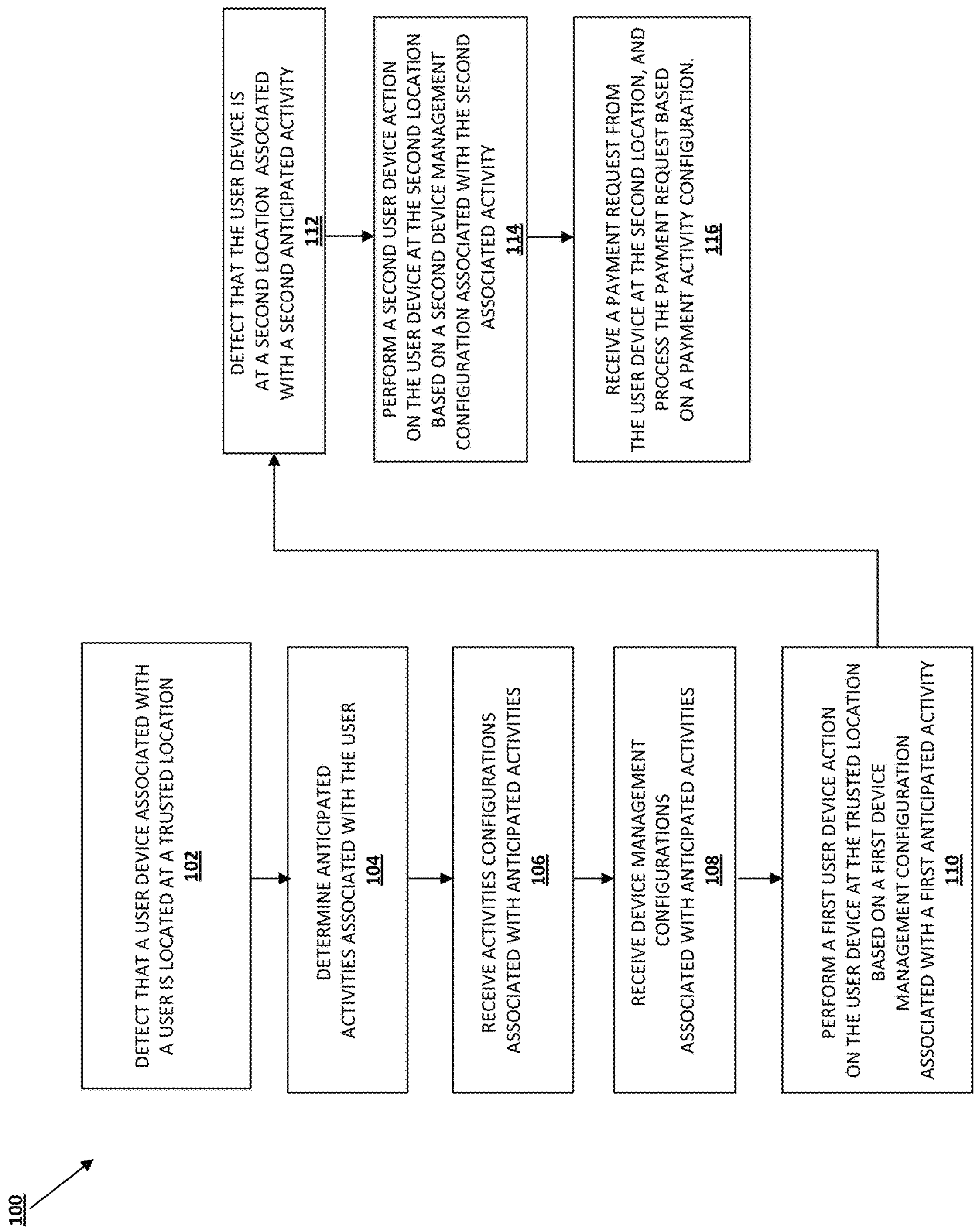
FIG. 1 is a flow chart illustrating an embodiment of a method for location-based device management.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes systems and methods for providing a location-based device and electronic authentication system. As discussed above, users may be exposed to increased security and privacy risks when the user is at a public location and connected to a public network. However, in embodiments of the systems and methods described herein, a system provider may manage a user device and activities performed using the user device according to the location of the user device, thereby reducing security and privacy risks and enhancing the user experience. For example, the system provider device may detect that the user device is located at a trusted location, such as the user's home or office, and, in response, may prepare the user device for anticipated activities by logging the user into applications that are associated with the anticipated activities, and pre-caching content that is associated with the anticipated activities while the user is at the trusted location. Furthermore, the system provider device may allow the user to provide configurations for various future activities (e.g., payment activities, gaming activities, etc.) when the user device is at a trusted location. By allowing the user to preapprove future activities such as purchases when the user device is at the trusted location, the user may make purchases at a public location without sending authentication information to a payment service provider through a public network. Moreover, the system provider device may increase security by using location data provided by the user's wearable devices to authenticate requests received from the user device.

Figure 2:
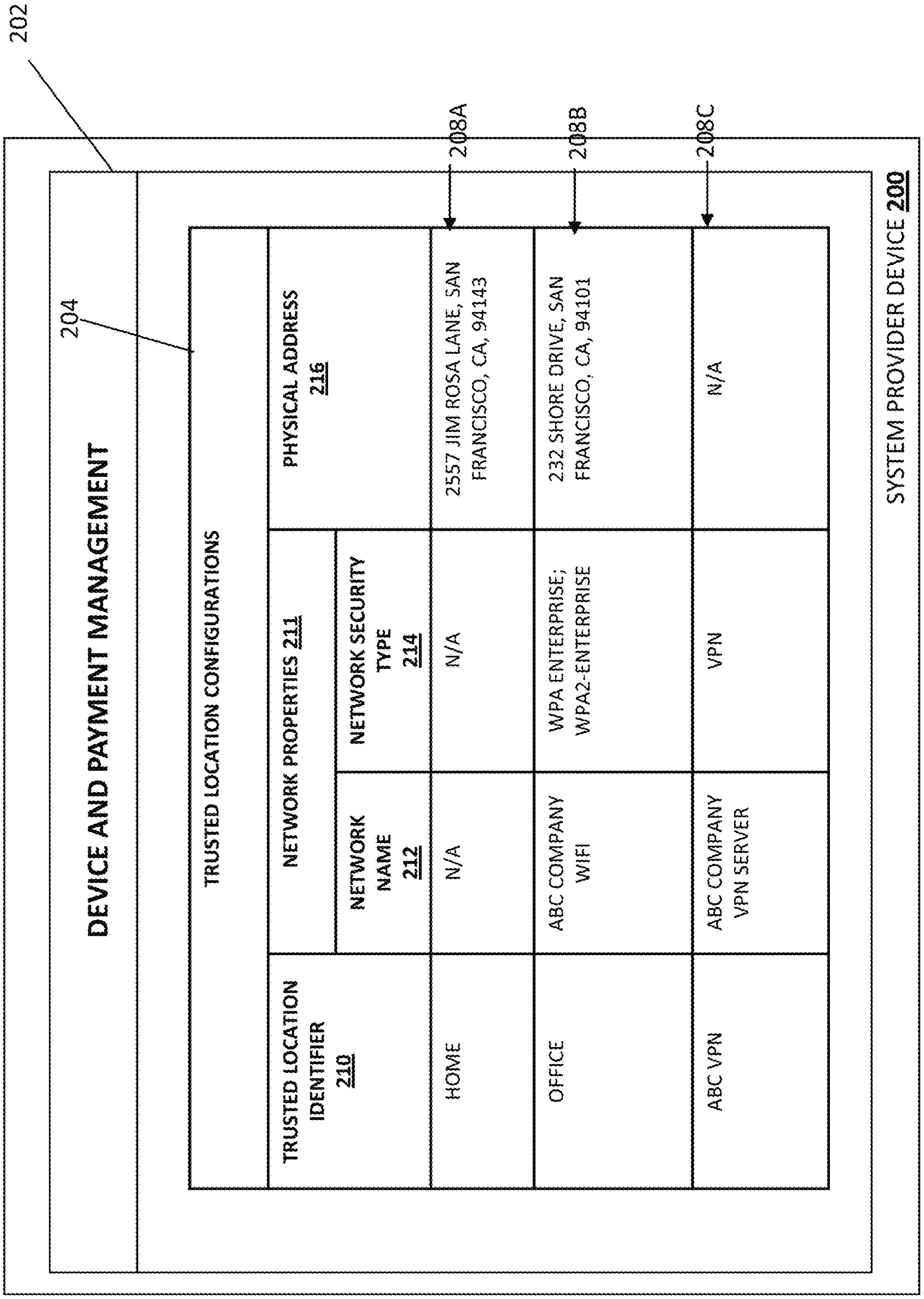
FIG. 2 is a screen shot illustrating an embodiment of a system provider device displaying a trusted location configurations screen.

Referring to FIG. 1, an embodiment of a method 100 for providing location-based device management and authentication is illustrated. Referring to FIGS. 1 and 2, the method 100 may begin at block 102 where a system provider device detects that a user device is located at a trusted location, which may be determined based on a location of the user device and/or a network that the user device is connected to according to the trusted location configurations discussed below.

Referring to FIG. 2, an embodiment of a system provider device displaying a trusted location configurations screen is illustrated. The system provider device 200 includes a display 202 displaying a trusted location configurations screen 204. The trusted location configurations screen 204 includes trusted location configurations 208A, 208B, and 208C that may have been previously received by the system provider device 200 (e.g., from a user). In the illustrated example, the trusted location configuration 208A identifies a trusted location associated with the user's home, and provides a physical address requirement 216 (e.g., "557 Jim Rosa Lane, San Francisco, Calif., 94143"). As discussed below, the system provider device may determine that the user device is at a trusted location after matching the user device's location with the user's home physical address. In the illustrated example, the trusted location configuration 208B identifies a trusted location associated with the user's office, and provides a network requirement 211 that includes a network name 212 (e.g., "ABC COMPAY WIFI"), a network security type 214 (e.g., "WPA ENTERPRISE, WPA2-ENTERPRISE"), and a physical address 218 of the user's office (e.g., "232 SHORE DRIVE, SAN FRANCISCO, CALIF., 94101"). As discussed below, the system provider device may determine that the user device is at a trusted location after determining that the user device satisfies both the network requirement 211 and the physical address requirement 216 of a particular trusted location configuration. In the illustrated example, the trusted location configuration 208C identifies that the user device may be considered to be at a trusted location if the user device is connected to a network using a VPN service provided by a particular VPN server (e.g., a VPN service provided by "ABC COMPANY VPN SERVER") without any physical address requirement.

In some embodiments of block 102, a system provider device may receive location data indicating the location of the user device. For example, the user device may include a location determination device (e.g., a Global Positioning System (GPS) device, a cell tower triangulation device, a Wi-Fi location determination device, and/or a variety of other suitable location determination devices) that determines and provides location data related to a current location of the user device. In such examples, the user device may be a mobile phone or wearable device that changes locations as the user moves, and may provide the current location of the user using the location determination device discussed above. Furthermore, in some embodiments of block 102, the system provider device may receive network information such as, for example, network names and network security types that are associated a network that the user device is connected to. At block 102, the system provider device may determine that the user device is located at a trusted location after determining that the network requirement and/or physical address requirement are satisfied according to trusted location configurations such as those illustrated in FIG. 2.

In some embodiments, a user may add, remove, and/or make other changes to the trusted location configurations (e.g., using a user device) or issuing a voice command (e.g., using voice control technologies such as, for example, ALEXA® available from Amazon.com, Inc. of Seattle, Wash.) to add a new trusted location configuration, to remove trusted location configuration, to modify trusted location configuration, etc.). In some examples, the user may only be allowed to make such changes to trusted location configurations when the user and/or the user device are located at the trusted location.

In some embodiments, trusted location configurations may be automatically generated by the system provider device, for example, based on the user's past activities. For example, the system provider device may automatically generate trusted location configurations for locations where the user has conducted at least a predetermined number of transactions in the past, locations associated with the user, such as a relative's home or office, a friend's home or office, the user's vacation home, and the like.

While a few examples have been provided, one of skill in the art in possession of the present disclosure will recognize that the trusted location may be any location where a user device may access a network safely and without the threat of having information transmitted over that network intercepted by a third party. As such, home network or work network that have known security standards, require minimum authentication characteristics, and/or provide other security assurances may be designated or determined to be trusted locations for use in the method 100. Furthermore, various network technologies (e.g., VPN, firewall, etc.) may be used to create a secure network connection over a public network. Such secure network connections may also be designated or determined to be trusted locations for use in the method 100. In different embodiments, trusted locations can also be specifically designated by the user, locations where the user has conducted at least a predetermined number of transactions in the past, locations associated with the user, such as a relative's home or office, a friend's home or office, the user's vacation home, and the like.

Figure 3:
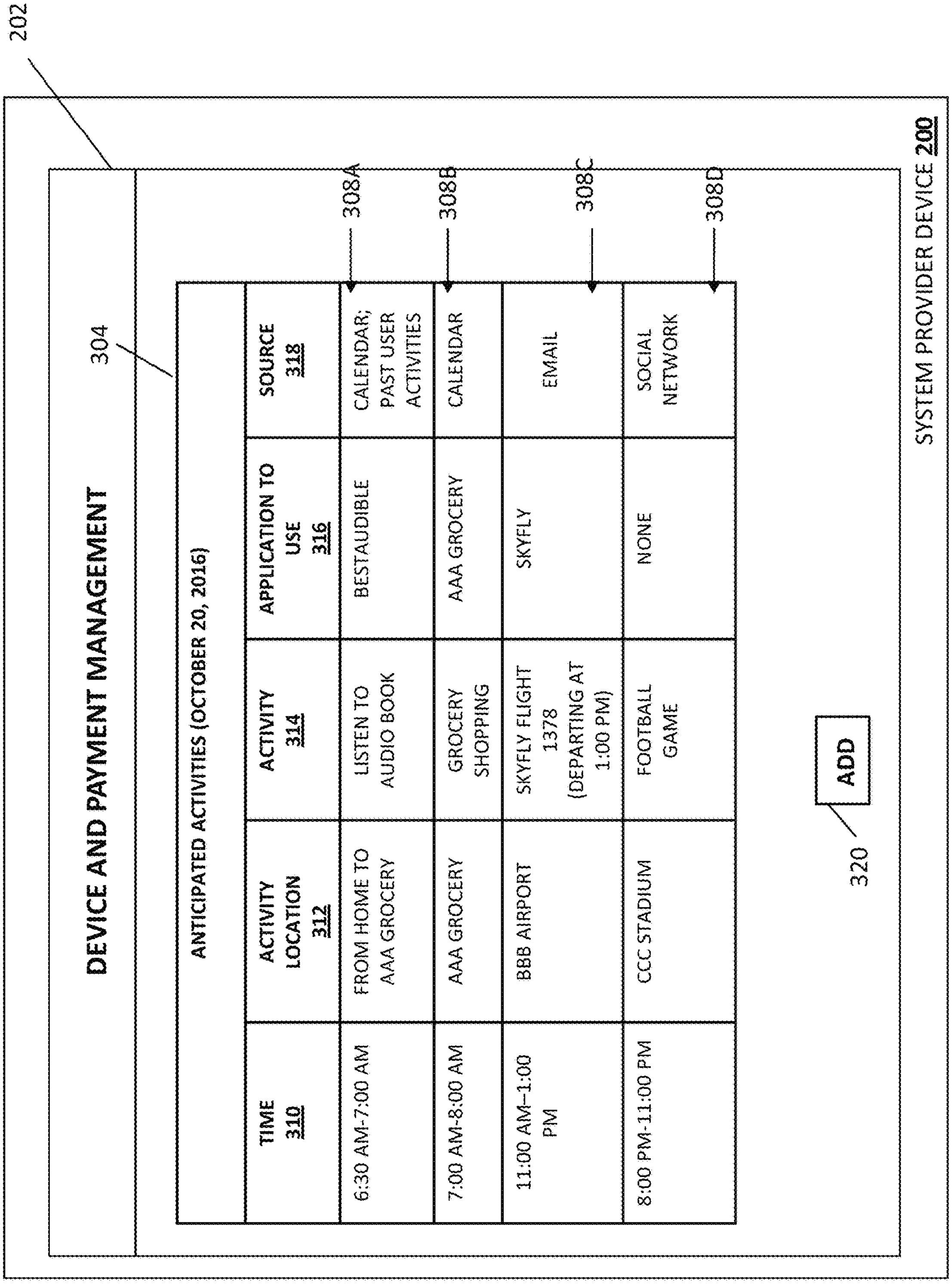
FIG. 3 is a screen shot illustrating an embodiment of a system provider device displaying an anticipated activities screen.

The method 100 may then proceed to block 104 where the system provider device may determine anticipated activities associated with the user. Referring to FIG. 3, the system provider device 200 is illustrated with the display 202 displaying an anticipated activity screen 304. The anticipated activity screen 304 includes anticipated activity information 308A, 308B, 308C, and 308D, each of which is associated with an activity that the user is likely to perform on a particular day (e.g., Oct. 20, 2016). In some embodiments of block 104, the system provider device may automatically predict activities for a user based on past user activities and/or future user activity collected from various applications (e.g., a calendar application, an email application, a social network application, etc.) on the user device. In some embodiments, a user may add, remove, and/or make other changes to the anticipated activities (e.g., by selecting the button 320 ("ADD") or issuing a voice command (e.g., using voice control technologies such as, for example, ALEXA® available from Amazon.com, Inc. of Seattle, Wash.) to add a new anticipated activity, to remove anticipated activities, to modify anticipated activities, etc.). In some examples, the user may only be allowed to make such changes to anticipated activities when the user and/or the user device are located at the trusted location.

In various embodiments, anticipated activity information may include various information associated with the particular anticipated activity including, for example, a time 310 indicating a possible time period for that anticipated activity, an activity location 312 indicating a location where the user is likely to be performing that anticipated activity, an activity 314 describing that anticipated activity, an application 316 identifying one or more applications on the user device that the user may use to perform the anticipated activity 314, and a source 318 indicating the sources that were used by the system provider device to determine that anticipated activity. In the illustrated example, the anticipated activity information 308A provides that at a time period between about 6:30 AM and 7:00 AM, the user is likely to listen to an audio book while driving from home to a grocery shop, and that the user may use a digital media mobile application (e.g., a "BESTAUDIBLE" mobile application) on the user device to perform that activity. In some examples, the anticipated activity information 308A may be generated based on both past user activities and a calendar application on the user device. In the illustrated example, the anticipated activity information 308B provides that at a time period between about 7:00 AM and 8:00 AM, the user is likely to be at a grocery shop (e.g., "AAA GROCERY") for grocery shopping, and the user may use an application provided by the grocery shop (e.g., an "AAA GROCERY" mobile application) on the user device to perform that activity. In the illustrated example, the anticipated activity information 308C provides that at a time period between about 11:00 AM and 1:00 PM the user is likely to be at an activity location 312 (e.g., "BBB AIRPORT") to take a flight (e.g., "SKYFLY FLIGHT 1378 DEPARTING AT 8:30 AM"), and the user may use a travel application (e.g., a "SKYFLY" mobile application) on the user device to perform that activity. In that example, the system provider device may generate the anticipated activity information 308C based on a flight reservation confirmation email in an email application on the user device. In the illustrated example, the anticipated activity information 308D provides that at a time period between about 8:00 PM and 11:00 PM the user is likely to be at an activity location 312 (e.g., "CCC STADIUM") to watch a football game, and no particular applications on the user device are expected to be used by the user to perform that activity. In that example, the anticipated activity information 308D may be generated based on information collected from social network applications on the user device (e.g., based on a post on the user's FACEBOOK® page).

Figure 4A:
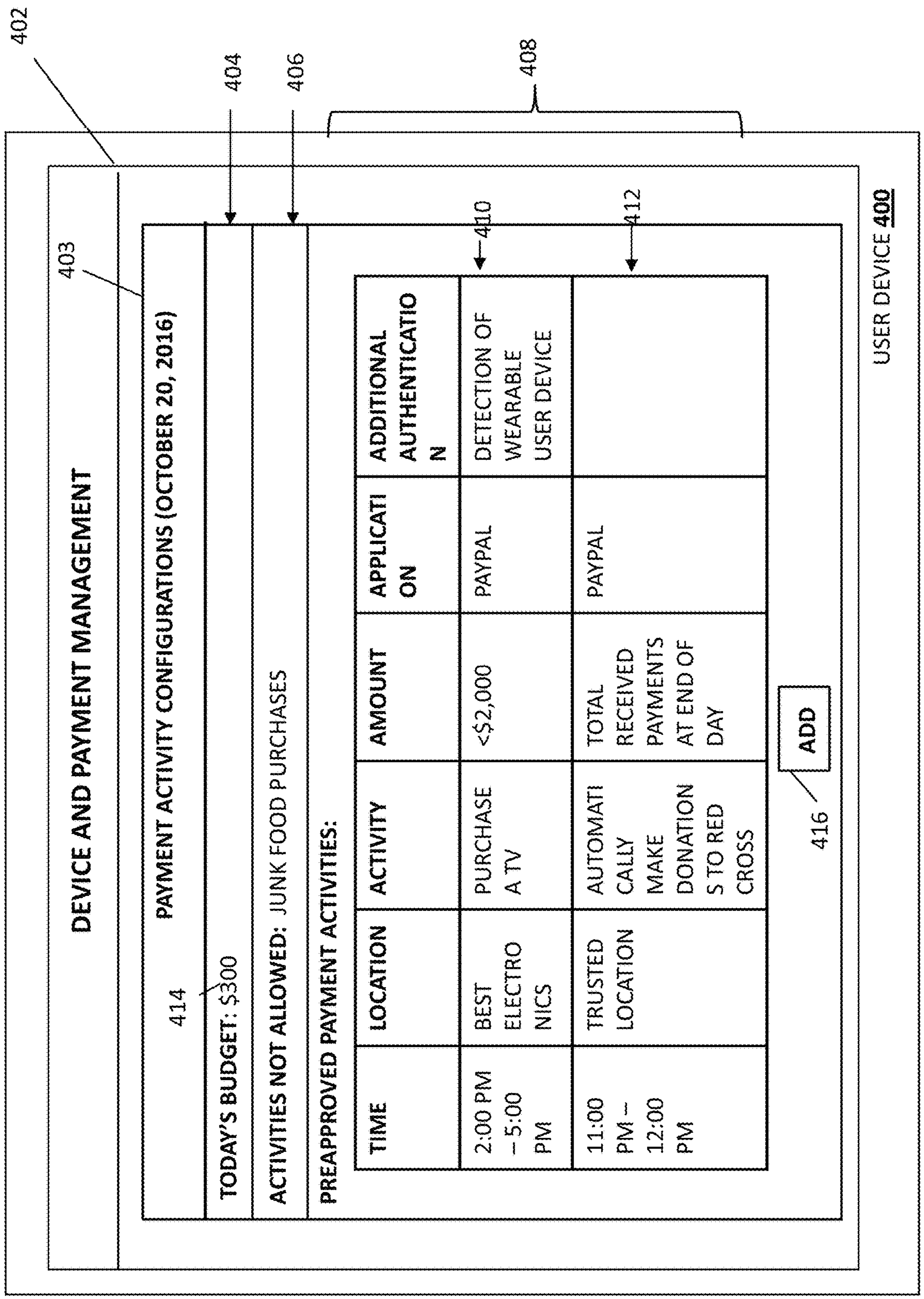
FIG. 4A is a screen shot illustrating an embodiment of a user device displaying a payment activity configurations screen.

The method 100 may then proceed to block 106 where the system provider device receives activity configurations associated with anticipated activities. As discussed below, at block 106, a user may plan future activities when the user device is located at a trusted location by providing activity configurations to the system provider device. Referring to FIG. 4A, a user device 400 is illustrated that includes a display 402 displaying a payment activity configurations screen 403 that allows the user to configure future payment activities. In the illustrated embodiment, the payment activity configurations screen 403 displays payment activity configurations 404, 406, and 408 for configuring future payment activities associated with the user. In the illustrated example, the payment activity configuration 404 includes a budget 414 (e.g., "$300") that may limit the user's total spending amount for a particular time period (e.g., a day in the illustrated example, but which may be a week, month, year, and/or other time period). In the illustrated example, the payment activity configuration 406 provides that no junk food purchases are allowed on the particular day.

In some embodiments, a user may provide payment activity configurations to preapprove future payment activities. In the illustrated example, the payment activity configuration 408 includes preapproved payment activity information 410 and 412. In that example, the preapproved payment activity information 410 provides that a payment using a payment application (e.g., "PAYPAL") for purchasing a TV for an amount (e.g., "<$2,000") at a particular activity location (e.g., "BEST ELECTRONICS") at a particular time period (e.g. "2:00 PM-5:00 PM") is preapproved by the user. In some embodiments, the preapproved payment activity information 410 may indicate that additional authentication is required for a payment request to be preapproved. For example, the additional authentication may require the detection of a wearable user device associated with the user at the activity location where the payment request is sent. As would be recognized by one of skill in the art in possession of the present disclosure, such a requirement for detecting a wearable user device may provide increased security because wearable user devices may be less vulnerable to theft or loss relative to other mobile devices (e.g., mobile phones). As such, the wearable user device may be different than the user device that is used to send the payment request. However, in some examples the user device 400 sending the payment request may be a wearable user device, which may satisfy the additional authentication requirement discussed above.

In the illustrated example, the preapproved payment activity information 412 provides that a payment to a charity (e.g., "MAKE DONATIONS TO RED CROSS") is preapproved, and that the payment will be made through a payment application (e.g., "PAYPAL") at a particular time (e.g., "11:00 PM-11:59 PM") from a user at a trusted location. The preapproved payment activity information 412 further provides that the donation amount is to be equal to all payments received in that payment application during that day. As discussed above, a user may select the button 416 ("ADD") to provide a new preapproved payment activity that may include information similar to the preapproved payment activities discussed above.

Figure 4B:
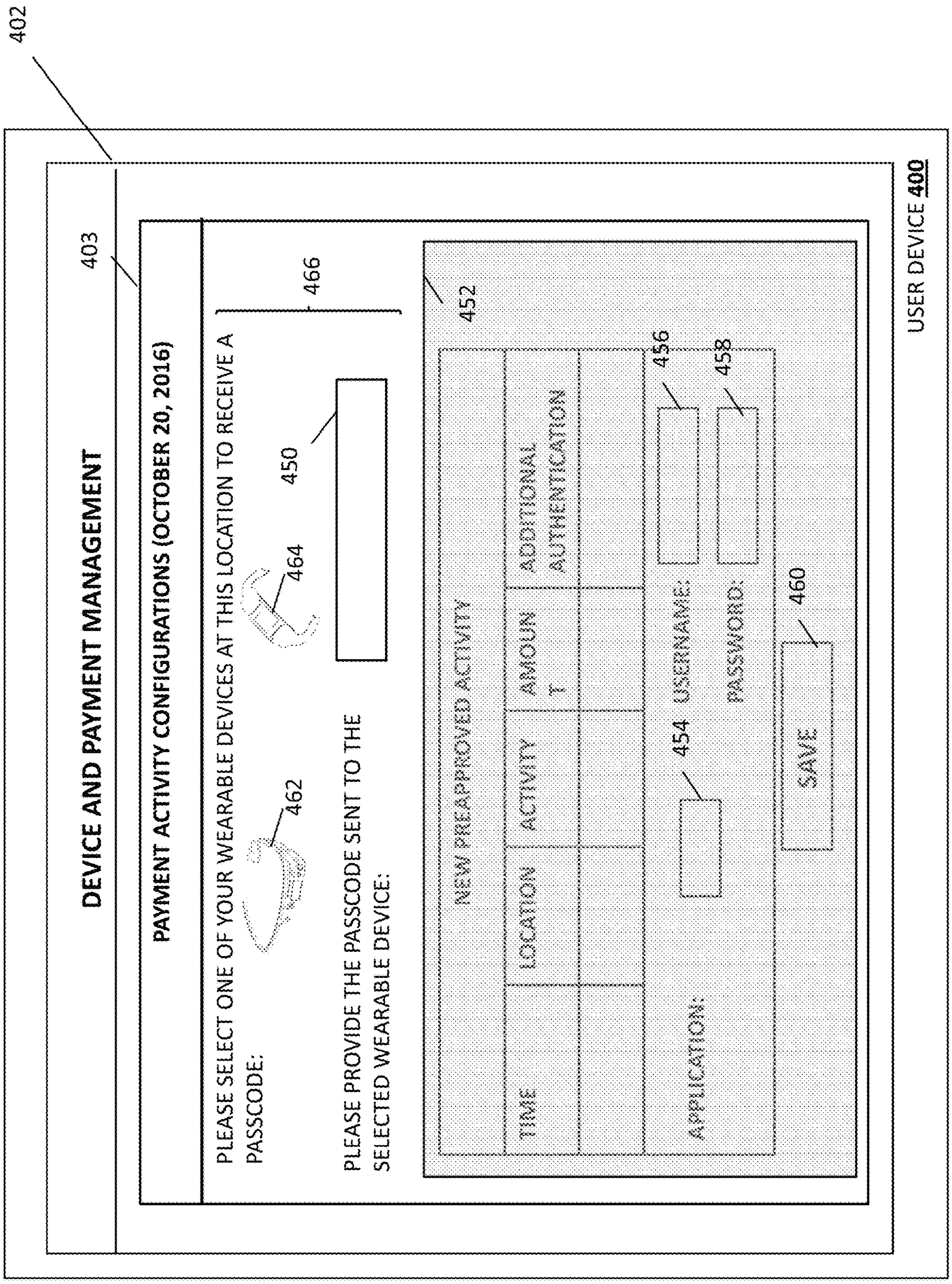
FIG. 4B is a screen shot illustrating an embodiment of a user device displaying a payment activity configurations screen.

Referring to FIG. 4B, the user device 400 is illustrated with the display 402 displaying a payment activity configurations screen 403 that may be provided after the user selects the button 416 discussed above with reference to FIG. 4A in order to provide a new preapproved payment activity. As illustrated in FIG. 4B, a higher security level may be required in order to configure payment activities. In the illustrated example, a payment activity configuration authentication 466 is required before a user may change, add, and/or remove payment activity configurations using the section 452. For example, the user may be required to provide a passcode in passcode field 450 to enable section 452 for adding a new preapproved payment activity. In some examples that passcode may be the same as the unlock passcode for unlocking the user device 400, or may be a passcode that is different from the unlock passcode for unlocking the user device 400.

As also illustrated in FIG. 4B, the additional payment activity configuration authentication may be associated with another user device that is associated with the user (e.g., a user device that is different from the user device 400). For example, the other user device may be a wearable user device (e.g. smart glasses such as, for example, Google Glass® available from Google Inc. of Mountain View, Calif.; smart watches such as, for example, Apple Watch® available from Apple Inc. of Cupertino, Calif.; etc.). As such, the additional payment activity configuration authentication may be satisfied after the system provider device detects that one or more wearable user devices associated with the user are at the trusted location. As illustrated in FIG. 4B, after detecting that one or more wearable user devices 462 and 464 that are associated with the user are located at the trusted location, the system provider device may request that the user select a wearable user device, and may then subsequently send a passcode to that selected wearable user device. The user may then provide the passcode that is received at the selected wearable user device back to the system provider device via the passcode field 450.

In some embodiments, after the system provider device determines the user has satisfied the requirement for the additional payment activity configuration authentication (e.g., by validating the passcode provided in passcode field 450), the section 452 may then be enabled so that the user may configure preapproved payment activities by using the section 452 to send a payment activity configuration request to the system provider device. For example, the payment configuration request may include payment activity configuration information that is associated with the payment activity (e.g., information about the time period for the payment activity, the location of the payment activity, details of the payment activity, the amount of the payment activity, additional authentication required for the payment activity, and other information associated with the payment activity). In some examples, the payment activity configuration information may include authentication information (e.g., provided by the user using the username field 456 and password field 458) for authenticating the user for a payment account at a payment service provider associated with the payment application 454. After the user selects the button ("SAVE") 460, the system provider device may generate a payment activity configuration based on the payment activity configuration request, and save the authentication information (e.g., login credentials for the payment application 454) associated with the new preapproved payment activity in a memory coupled to the system provider device. In subsequent steps, the system provider device may retrieve the username and password from the memory to process payment requests received from the user device 400, which will be described in further detail below.

The method 100 may then proceed to block 108 where the system provider device receives device management configurations associated with anticipated activities. In some embodiments, the device management configurations may be default configurations provided by the system provider device 200 and may be applicable to a plurality of users and/or a plurality of user devices. In other embodiments, the device management configurations may be configured by a user, and thus may be customized for a single user and/or a single user device.

Figure 5:
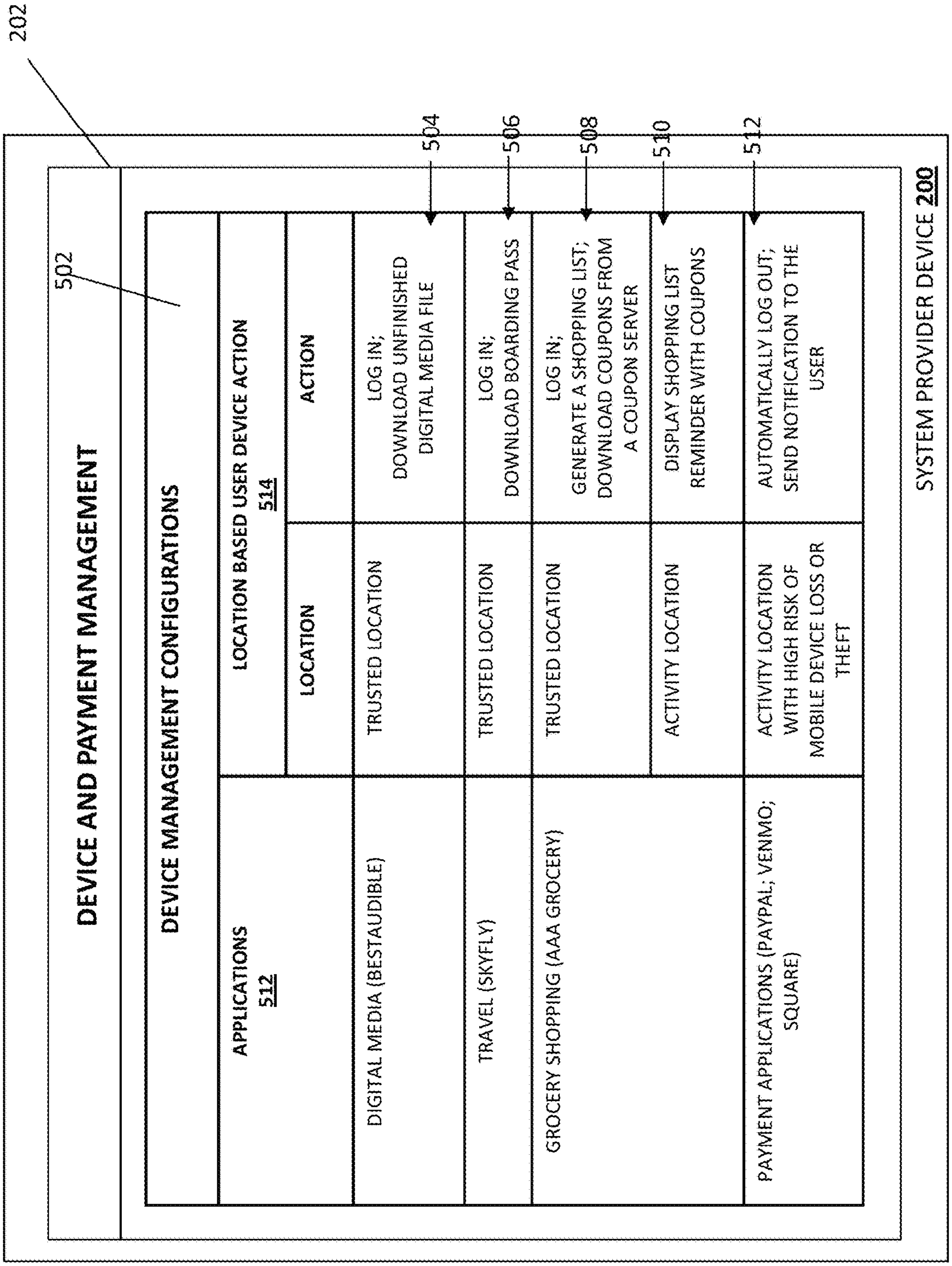
FIG. 5 is a screen shot illustrating an embodiment of a system provider device displaying a device management configurations screen.

Referring to FIG. 5, the system provider device 200 is illustrated with the display 202 displaying a device management configuration screen 502 that includes device management configurations 504, 506, 508, and 510. In some embodiments, the device management configurations may provide different user device actions based on different types of the applications associated with the anticipated activities. In the illustrated example, the device management configuration 504 provides that, for anticipated activities (e.g., "LISTEN TO AUDIO BOOK") associated with a digital media application (e.g., "BESTAUDIBLE" mobile application) and after determining that the user device is at a trusted location, the user device may automatically log the user into the digital media application (e.g., by using login credentials for the digital media application stored in the system provider device and/or the user device) and download content (e.g., unfinished digital media files that the user last listened from a service provider device associated with a service provider for the digital media application) to enable the anticipated activity (e.g., listening to digital media files). In the illustrated example, the device management configuration 506 provides that, for anticipated activities (e.g., "SKYFLY FLIGHT 1378") associated with a travel application (e.g., a "SKYFLY" mobile application) and after determining that the user device is at a trusted location, the user device may automatically log the user in the travel application and download content (e.g., boarding pass for the upcoming flight) from a service provider device associated with the travel application to enable the anticipated activity (e.g., taking a flight). In some embodiments, the user may remain logged into the application so that the user may not be required to provide authentication information at a public location (e.g., the airport) through a public network when the user uses that application for performing the anticipated activity (e.g., presented the boarding pass to board the flight).

In different embodiments, the device management configurations may provide different user device actions that will be performed based on different detected locations while using the same application that is associated with an anticipated activity. For example, the device management configuration 508 provides that, for an anticipated activity (e.g., "GROCERY SHOPPING") associated with grocery shopping applications 512 (e.g., AAA GROCERY mobile application) and after determining that the user device is at a trusted location, the associated grocery shopping application on the user device may automatically log the user in, generate a shopping list (e.g., based on the user's past shopping history), and download content (e.g., coupons associated with the shopping list) to enable the anticipated activity (e.g., grocery shopping). Furthermore, the device management configuration 510 provides that, after determining that the user device is at the activity location (e.g., an AAA GROCERY store), the associated grocery shopping application on the user device may automatically display a shopping list reminder that may include the shopping list and the associated coupons.

In some embodiments, the device management configurations may include user device actions that are determined based on a risk level for theft of the mobile device at a location. For example, the device management configuration 512 provides that, for an anticipated activity (e.g., watching a football game) at an activity location (e.g., "CCC STADIUM"), there is a high risk that the mobile device may be stolen, and the user may be automatically logged out of various applications (e.g., payment applications), while notifications about the high-risk location may be sent to the user through the user device.

The method 100 may then proceed to block 110 where user device actions are performed on the user device at the trusted location based on device management configurations that are associated with anticipated activities. As discussed below, the user device actions operate to prepare the user device so that the user may quickly and easily perform the anticipated activities. Referring to FIGS. 3 and 5, in some embodiments, at block 110 the system provider device may retrieve a device management configuration that is associated with a particular anticipated activity (e.g., that is based on an application that is associated with the particular anticipated activity), and determine a user device action associated with the trusted location. The system provider device may then send a notification to the user device that causes the user device to perform the user device action while the user device is at the trusted location.

In some embodiments, at block 110 the user device action includes transferring data to the user device through a network to prepare the user device for the anticipated activity. For example, according to anticipated activity information 308A and device management configuration 504 associated with the digital media application, when the user device is at a trusted location the system provider device may send a notification to the user device that causes data (e.g., remaining portions of an unfinished audio book that the user last listened to) that is associated with the anticipated activity identified by anticipated activity information 308A to be transferred from a service provider device associated with the digital media application (e.g., a server for the "BESTAUDIBLE" mobile application) to the user device. In another example, according to anticipated activity information 308C and device management configuration 506 associated with the travel application, when the user device is at a trusted location the system provider device may send a notification to the user device that causes data associated with a flight (e.g., a boarding pass) to be transferred from a service provider device associated with the travel application (e.g., a server for the "SKYFLY" mobile application) to the user device. By pre-caching content for the application on the user device at a trusted location (i.e., causing the data to be transferred and stored on the user device as discussed above), the user may later use the application to access the content associated with that data (e.g., the audio book, the boarding pass) at another location with no network connections, limited network connections, and/or without the need to connect to the public network. Furthermore, the user experience is enhanced by eliminating any delay caused by the need to download such data/content through a slow network, which also improves operation of the user device, such as by reducing processing power needed to download content with a less efficient network than what was available at the trusted location.

In some embodiments, at block 110 the user device action includes performing a preparation task in addition to receiving data from a server to prepare the user device for the anticipated activity. For example, the anticipated activity information 308B includes that the user is likely to use a grocery shopping application (e.g., "AAA GROCERY" mobile application) on the user device for grocery shopping later in the day. According to device management configuration 508 associated with the grocery shopping application, when the user device is at a trusted location the system provider device may send a request to the user device to cause the grocery shopping application to perform a preparation process that includes generating a shopping list for the user (e.g., based on past grocery shopping activities). Furthermore, the preparation process may include the user device downloading coupons associated with items in the shopping list (e.g., from a server provided for the grocery shopping application, or a coupon server that may be different from the server provided for the grocery shopping application). By performing the preparation process when the user device is at a trusted location, the user experience is enhanced by eliminating any delay caused by the need to perform such tasks at the time that the user uses the grocery shopping application at the grocery store.

In some embodiments, no particular user device actions may be required to prepare the user device for a particular anticipated activity at a trusted location. For example, the anticipated activity information 308D indicates that the user is likely to watch a football game at a stadium later in the day, but without utilizing any particular application during that activity. Accordingly, no user device action may be performed on the user device at the trusted location to prepare for that anticipated activity.

In some embodiments, the system provider device may automatically initialize the preparation process that prepares the user device for the anticipated activities (e.g., by causing the user device to perform various user device actions associated with the anticipated activities) in response to detecting that the user device is at a trusted location. In some embodiments, the preparation process may be triggered or customized using the user's voice (e.g., using voice control technologies such as, for example, ALEXA® available from Amazon.com, Inc. of Seattle, Wash.). For example, the system provider device may start the preparation process in response to receiving a voice command from the user through the user device. Furthermore, the user may issue voice commands to customize the preparation process (e.g., by specifying a particular audio book to download, setting a payment activity configuration, etc.). In such examples, security may be enhanced by utilized voice authentication to authenticate the user issuing the voice command.

The method 100 may then proceed to block 112 where the system provider device detects that the user device is at a second location. In an embodiment, the system provider device may determine that the user device is at a second location that is different from the trusted location detected at block 102 based on a location received from a location determination device on the user device. In some examples, the system provider device may then determine that the second location is associated with a particular anticipated activity by matching the second location with activity locations identified by the anticipated activity information.

Figure 6:
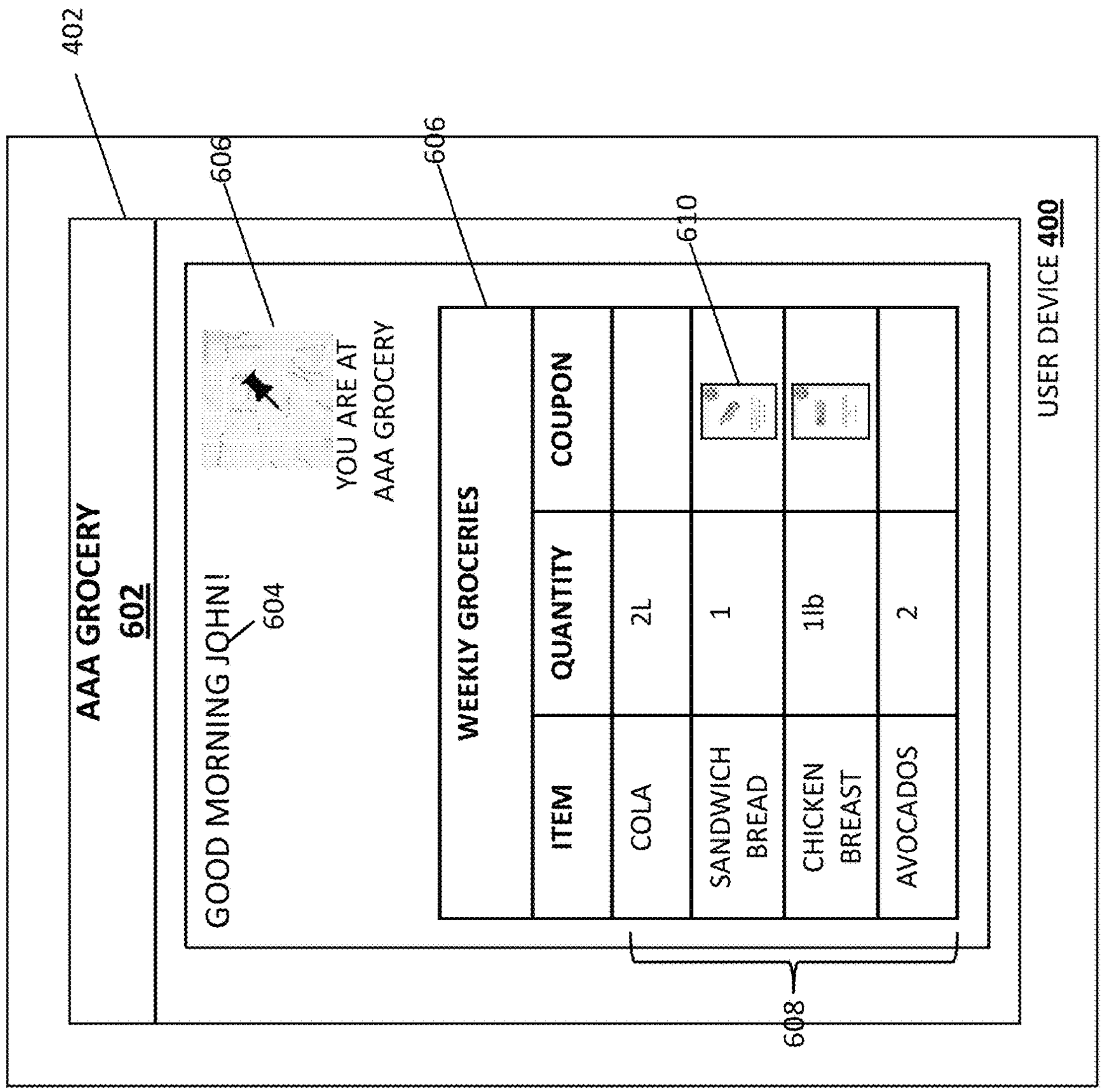
FIG. 6 is a screen shot illustrating an embodiment of a user device displaying a grocery shopping application screen.

The method 100 may then proceed to block 114 where a second user device action is performed on the user device according to a device management configuration when the user device is located at the second location. Referring to FIG. 6, in some embodiments, the user device action on the user device at the second location may be performed to assist the user in the anticipated activity at the second location. For example, the system provider device may detect that the user device is located at a grocery store (e.g., "AAA GROCERY") and determines that the user has arrived at an activity location to perform an anticipated activity (e.g., "GROCERY SHOPPING") according to anticipated activity information 308B. The system provider device may then determine that device management configuration 510 is associated with the particular activity location, and send a request to the user device 400 according to device management configuration 510 to cause the user device 400 to display a shopping list reminder for the user. Referring to FIG. 6, the user device 400 is illustrated with the display 402 displaying a grocery shopping application screen 602 that includes a shopping list reminder 606. In the illustrated example, the shopping list reminder 606 provides a shopping list 608 generated at a trusted location (e.g., "HOME") at block 110 according to device management configuration 508. As illustrated, the shopping list reminder 606 may also include coupons 610 that are associated with items in the shopping list 608 and that were downloaded to the user device at a trusted location (e.g., "HOME") at block 110 according to device management configuration 508.

In some examples, by logging the user 604 (e.g., "JOHN") into the grocery shopping application at a trusted location (e.g., "HOME") at block 110 and keeping the user logged in, when the user arrives at the grocery store the user may use the grocery shopping application without providing authentication information (e.g., login credentials) through a public Wi-Fi network (e.g., provided by the grocery store), which reduces risks associated with sending login credentials through an untrusted public network at the grocery store.

In some examples, the user 604 may be logged out of the grocery shopping application after the system provider device determines that the anticipated activity associated with anticipated activity configuration 308B has been completed. For example, after the system provider device determines that the user device has made a payment at a checkout terminal of the grocery store and/or that the user device is no longer located at the grocery store, the system provider device may log the user device out of the grocery shopping application, or cause the user device to log out of the grocery shopping application.

Figure 7:
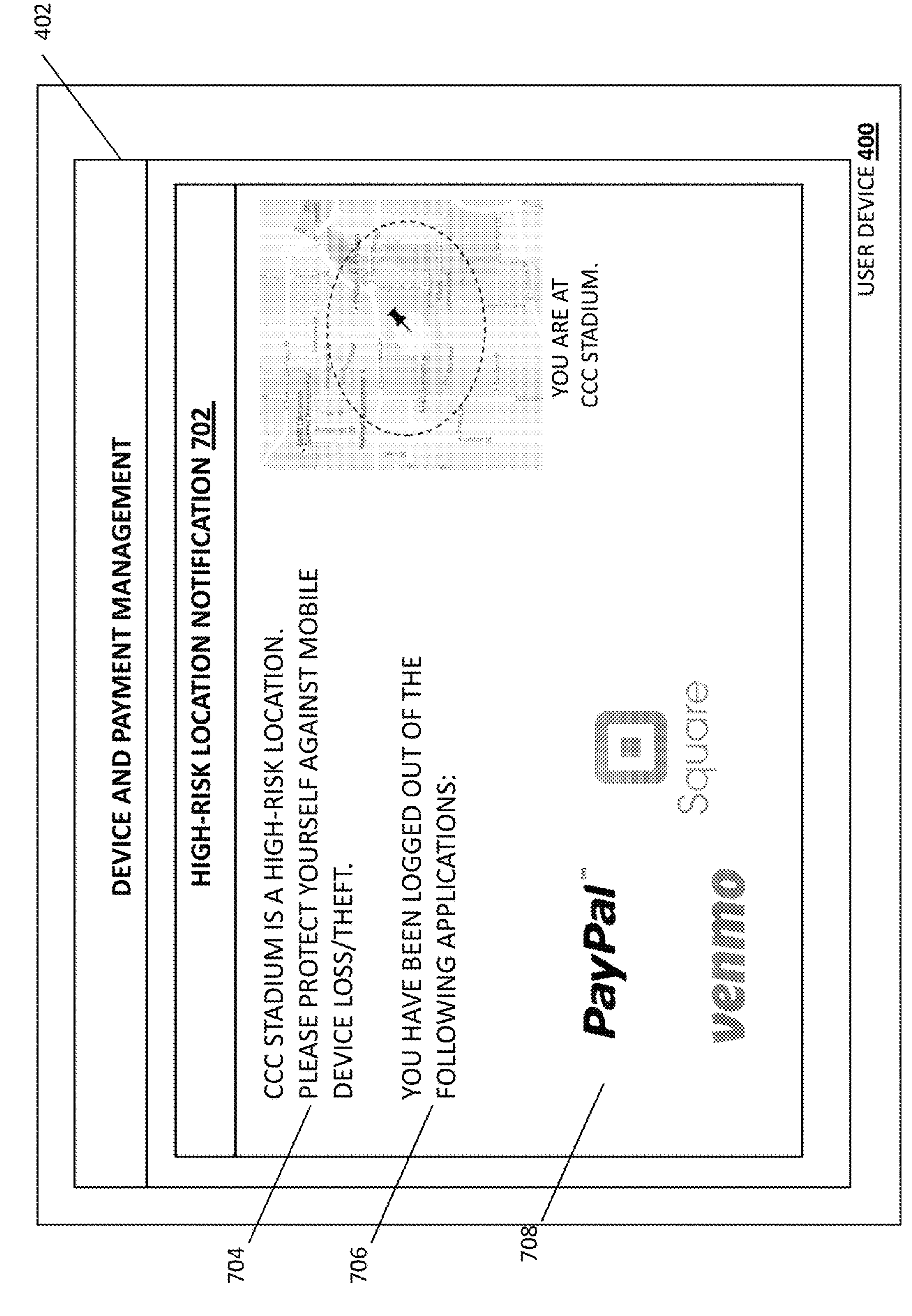
FIG. 7 is a screen shot illustrating an embodiment of a user device displaying a high-risk location notification screen.

Referring to FIG. 7, in some embodiments the user device action is performed on the user device at the second location after the system provider device determines that the user device is at a high risk of loss or theft at the second location at a particular time (e.g., based on types of stores (e.g., coffee shops, restaurants, bars) and/or events (e.g., concerts, sporting events) associated with the second location at the particular time). In the particular example illustrated in FIG. 7, the system provider device has detected that the user device is located at a stadium (e.g., "CCC STADIUM") for a sporting event (e.g., "FOOTBALL GAME") according to anticipated activity information 308D, and determined that the stadium is a high-risk location. According to the device management configuration 512 associated with such high-risk locations, the system provider device may send a request to the user device to cause the user device 400 to display a notification on the user device, and/or automatically log the user out of various applications (e.g., payment applications). As illustrated in FIG. 7, the user device 400 is illustrated with the display 402 displaying a high-risk location notification screen 702 that includes a message 704 notifying the user about the risk of mobile device loss or theft. In such examples, if the system provider device detects that the user is still logged in various payment applications at the second location, the system provider device may send a request to the user device to cause the user device to automatically log the user out of those payment applications. In some examples, the user may receive a logout message 706 displayed on the high-risk location notification screen 702 after the user is logged out of payment applications 708.

The method 100 may then proceed to block 116 where the system provider device receives a payment request from the user device at the second location and processes the payment request based on a payment activity configuration. The payment activity configuration may be generated based on payment activity information received by the system provider device from the user device while the user device is located at the trusted location. In some embodiments, the system provider device may determine that the payment request is disallowed according to the payment activity configuration, automatically decline the payment request, and send a payment declined notification to the user device. In other embodiments, the system provider device may determine that the payment request is preapproved according to the payment activity configuration, automatically authorize the payment request, and send a payment transaction completed notification to the user device. In yet other embodiments, the system provider device may determine that the payment request is neither disallowed nor preapproved according to the payment activity configuration, and may request that the user to provide additional authentication information (e.g., passcode, fingerprint, other biometric characteristics, and/or a combination thereof) to proceed with the payment request.

Figure 8:
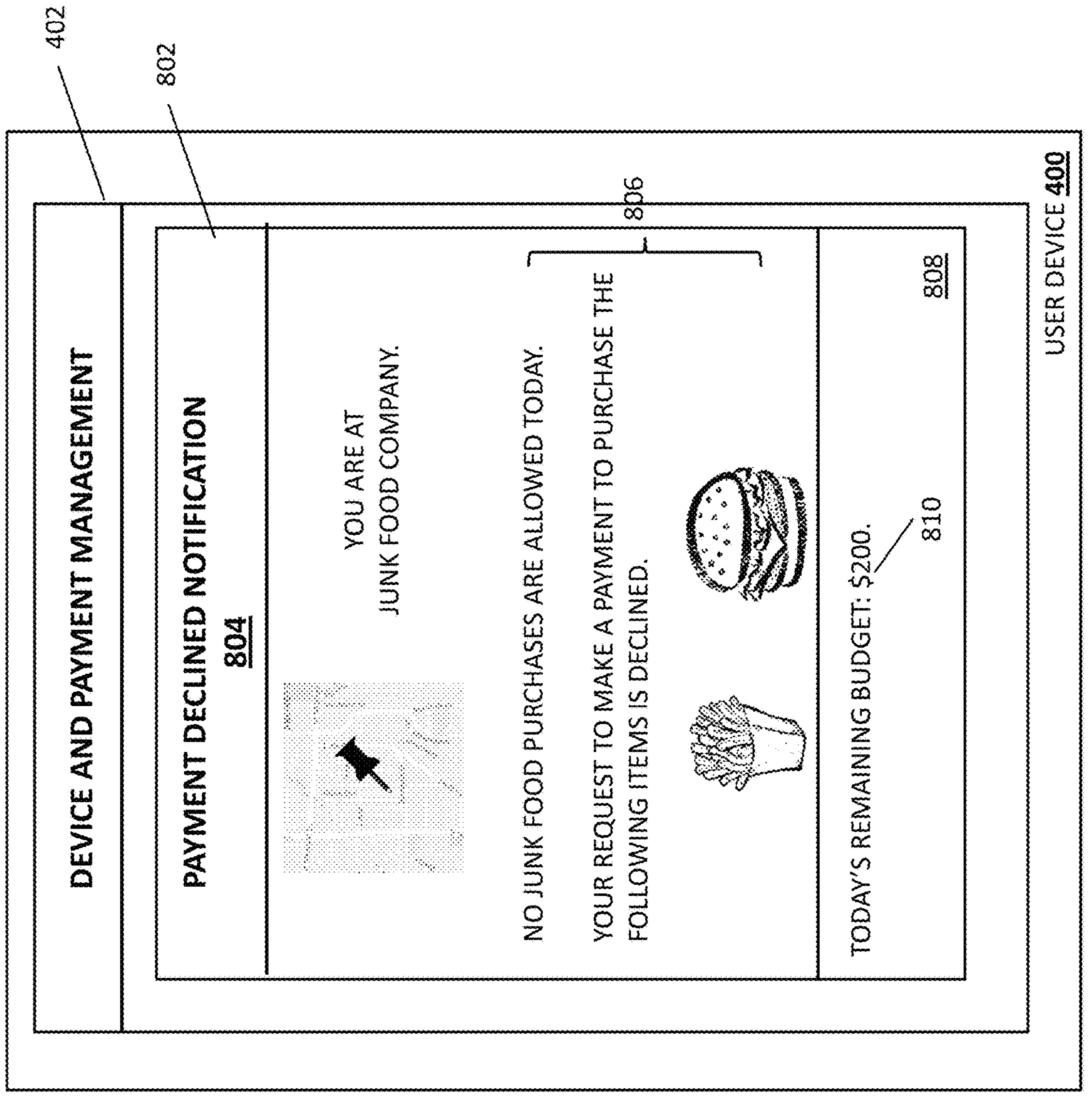
FIG. 8 is a screen shot illustrating an embodiment of a user device displaying a payment declined notification screen.

Referring to the example illustrated in FIG. 8, the user device 400 is illustrated with the display 402 displaying a payment declined notification screen 802 including a payment declined notification section 804. For example, the system provider device may detect that the user device is at a location associated with "JUNK FOOD COMPANY" and may receive a payment request from the user device at that location. The payment request may include information for items to purchase (e.g., fries and a burger), payee information (e.g., "JUNK FOOD COMPANY"), a payment amount, and/or other information associated with the payment. The system provider device may then determine that the payment request is associated with junk food purchases (e.g., based on payee information, location, and/or items to purchase), retrieve the corresponding payment activity configuration 406 associated with junk food purchases, and determines that the payment request is not allowed. In some examples, the system provider device may automatically decline the payment request and send a payment declined notification to the user device. As shown in FIG. 8, the payment declined notification section 804 may include a payment declined message 806 notifying the user that the payment request for junk food is declined.

In embodiments where the user has provided a budget for all payment activities (e.g., by providing a payment activity configuration 404 when the user device is at a trusted location), the system provider device may track payment transactions (e.g., from a plurality of payment applications), consolidate those payment transactions, and determine a remaining budget. In examples where there is remaining budget, the system provider device may then send the remaining budget 810 (e.g., "$200") to the user device for display in a remaining budget section 808. In examples where there is no remaining budget, the system provider device may automatically decline any payment request and send a notification to the user notifying the user that the payment request is declined because the user had used up the budget for that day.

Figure 9:
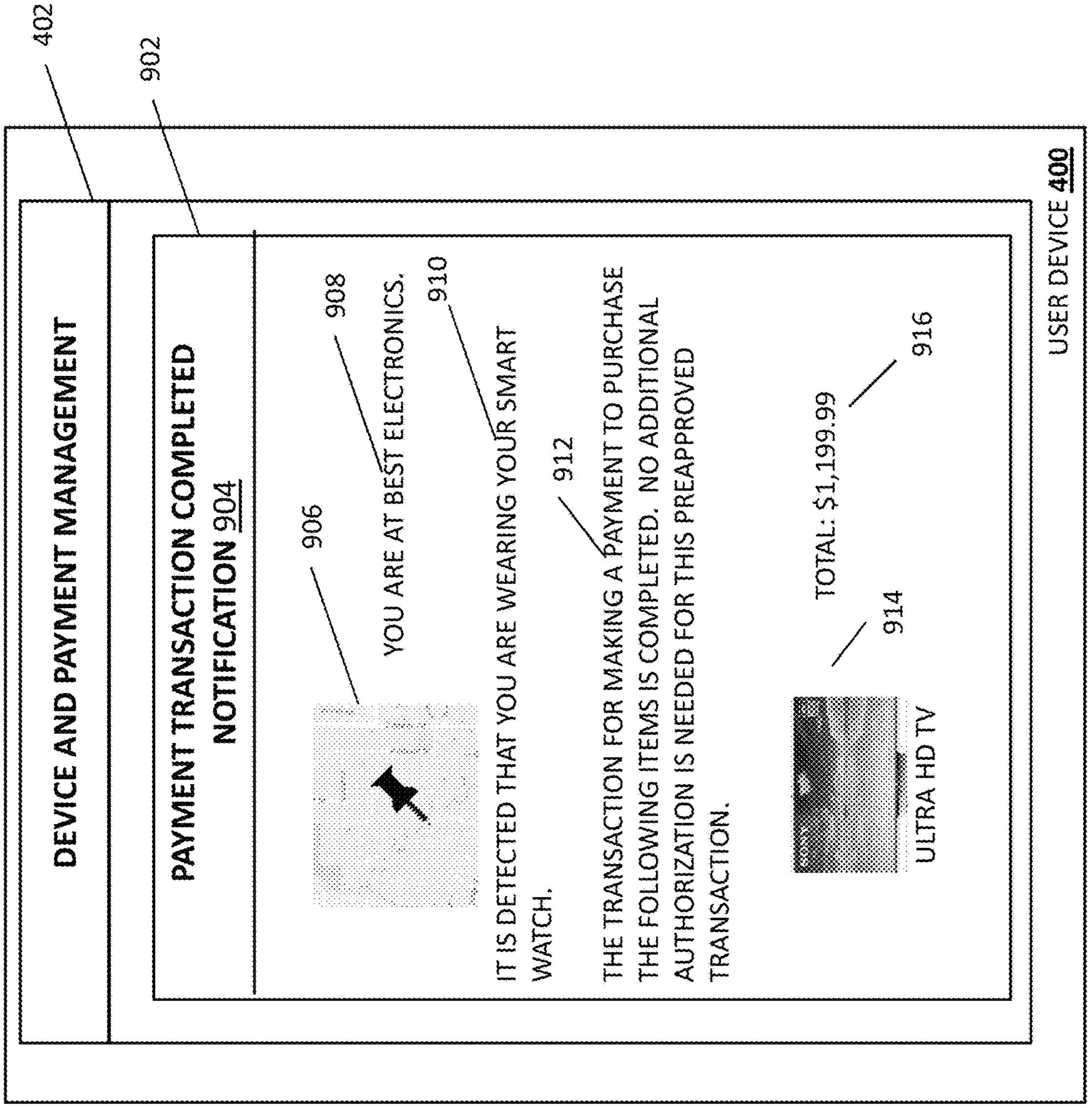
FIG. 9 is a screen shot illustrating an embodiment of a user device displaying a payment transaction completed notification screen.

Referring to the example illustrated in FIG. 9, the user device 400 is illustrated with the display 402 displaying a payment transaction completed notification screen 902 that includes a payment transaction completed notification section 904. In an example, the system provider device may detect that the user device is at a location associated with "BEST ELECTRONICS," and receive a payment request from the user device at that location. The payment request may include information for items to purchase (e.g., "ULTRA HD TV"), payee information (e.g., "BEST ELECTRONICS"), a payment amount (e.g., "$1,199.99"), and/or other information associated with the payment. The system provider device may then determine that the payment request is associated with preapproved payment activity information 410 based on the location, items to purchase, and/or amount of the payment request. Furthermore, the system provider device may detect that a wearable user device (e.g., "SMART WATCH") associated with the user is at that location and satisfies the additional authentication requirement of preapproved payment activity information 410. As such, the system provider device may determine that the payment request is preapproved according to preapproved payment activity information 410.

In some embodiments, after determining that the payment request is preapproved, the system provider device may retrieve (e.g., from a memory coupled to the system provider device) authentication information (e.g., login credentials) associated with a payment service provider based on the preapproved payment activity information 410, and send the retrieved authentication information to the payment service provider to authenticate the user for a payment account at the payment service provider and complete a payment transaction associated with the payment request. As such, the user may make purchases at a public location without sending authentication information from the user device to a payment service provider through a public network.

As illustrated in FIG. 9, after the payment service provider completes the payment transaction associated with the payment request, the system provider device may send a payment transaction completed notification 904 to the user device 400. The payment transaction completed notification 904 includes a map 906 and an identifier 908 (e.g., "BEST ELECTRONICS") that indicates the current location of the user device 400. The payment transaction completed notification 904 further includes a wearable device detection message 910 providing that a wearable device (e.g., “SMART WATCH”) associated with the user was detected at that location. The payment transaction completed notification 904 also includes a payment details message 912 that identifies the purchased item 914 and the transaction amount 916.

It is noted that while payment activities are used in the examples above to describe activity planning and management, those examples are not meant to be limiting. In other embodiments, a user may plan and manage other activities (e.g., digital media activities, education activities, gaming activities, etc.) that are associated with the user device and that are based on activity configurations associated with those activities. For example, the user may plan and manage gaming activities associated with the user device using gaming activity configurations. In those examples, while the user device is located at a trusted location, the user may provide a gaming activity configuration to the system provider device that may set a limit on the total amount of time that the user may play games on the user device on a particular day, and specify a user device action (e.g., disable the associated gaming applications on the user device) to be performed on the user device after determining that the limit has been reached. As such, according to the gaming activity configuration, the system provider device may track the usage of a plurality of gaming applications (e.g., CLASH OF CLANS®, MINECRAFT®, etc.) on the user device during the day, and after determining that the gaming time limit has been reached, the system provider device may send a notification to the user device to cause the user device action to be performed to disable an associated gaming application.

In some embodiments, different security settings may be applied for configuring different activities. For example, configuring payment activities using payment activity configurations may be associated with a relatively high security setting (e.g., that requires a payment activity configuration authentication 466 of FIG. 4B), while configuring other activities (e.g., digital media activities, education activities, gaming activities) may be associated with a relatively low security setting (e.g., may not require additional authorization).

Thus, systems and methods have been described that provide users, system providers, payment service providers, and various third-party service providers a location-based device and payment management system that manages user device and payment activities based on the location of the user device. The system provider device may anticipate future activities based on the user’s past activities, information associated with future activities provided by various applications (e.g., calendars, emails, social networks, travel applications, etc.), and/or a combination thereof. When the system provider device determines that the user device is at a trusted location, the system provider device may prepare the user device for the anticipated activities by, for example, causing the user to be logged into applications on the user device so that the user need not send login credentials through an unsecured network at another location, causing content associated with the anticipated activities to be loaded on the user device through a trusted network so that that content is available when the user performs the anticipated activity associated with that content, and/or perform other user device actions that enhance the user experience in performing the anticipated activities. The system provider device may also allow the user to manage various activities (e.g., payment activities, gaming activities, etc.) while the user device is at a trusted location, which may be associated with different security levels such as, for example, requiring additional authentications for managing payment activities that may require authentications provided by wearable devices associated with the user for improved security.

Figure 10:
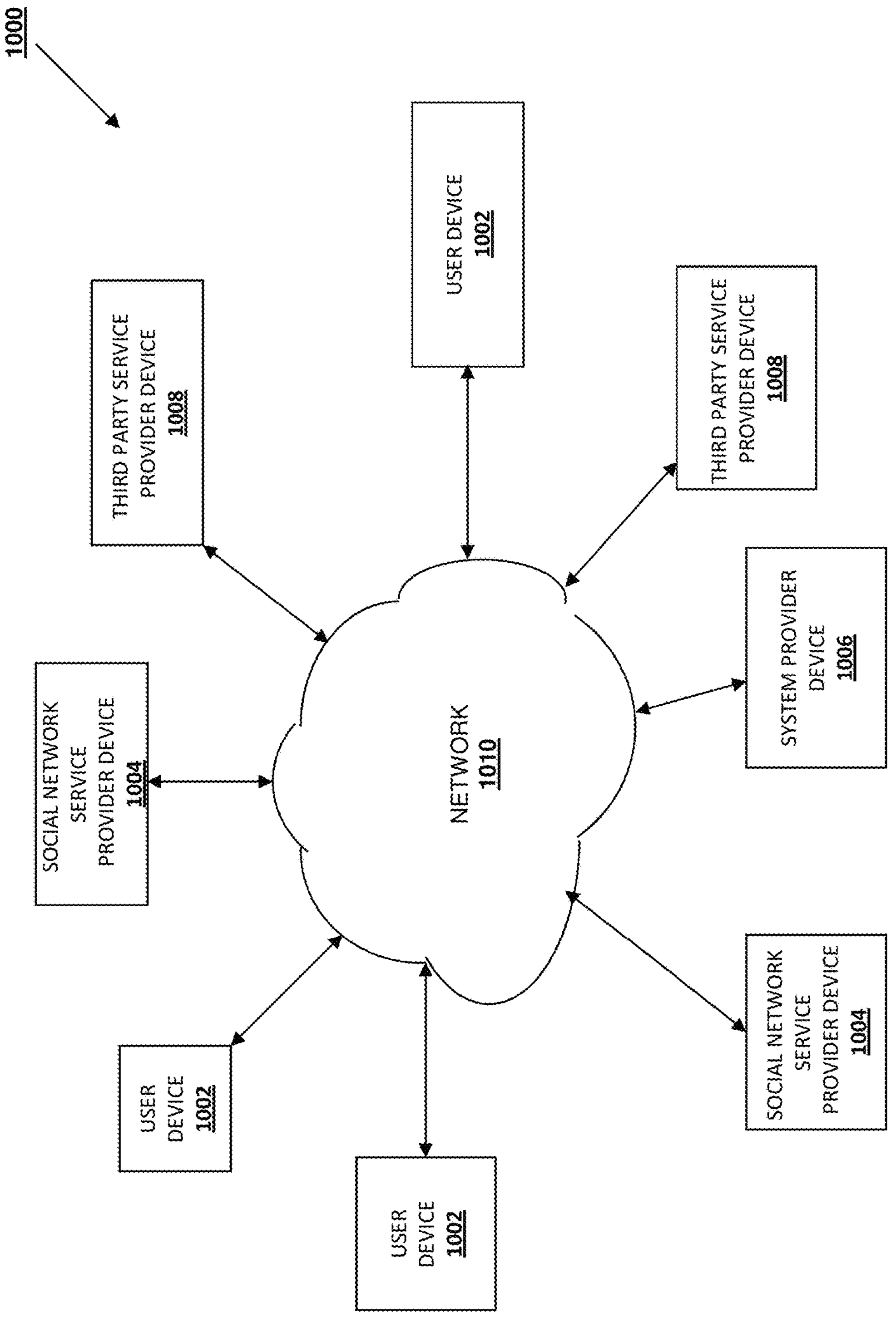
FIG. 10 is a schematic view illustrating an embodiment of a networked system.

Referring now to FIG. 10, an embodiment of a network-based system 1000 for implementing one or more processes described herein is illustrated. As shown, network-based system 1000 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 10 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 1000 illustrated in FIG. 10 includes one or more user devices 1002, one or more social network service provider devices 1004, one or more system provider devices 1006, and one or more third party service provider devices 1008 in communication over a network 1010. Any of the user devices 1002 may be the user device 400 discussed above and used by the user discussed above. The system provider device 1006 may be the system provider device 200 discussed above and may be operated by a system provider such as, for example, PayPal Inc. of San Jose, Calif. The third party service provider device 1008 may be the service provider device discussed above and may be operated by various service providers including payment service providers, gaming service providers, travel service providers, and/or any other service providers.

The user devices 1002, social network service provider devices 1004, system provider devices 1006, and third party service provider devices 1008 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 1000, and/or accessible over the network 1010.

The network 1010 may be implemented as a single network or a combination of multiple networks. For example, in various embodiments, the network 1010 may include the Internet and/or one or more intranets, landline networks, wireless networks, and/or other appropriate types of networks.

The user device 1002 may be implemented using any appropriate combination of hardware and/or software configured for wired and/or wireless communication over network 1010. For example, in one embodiment, the user device 1002 may be implemented as a personal computer of a user in communication with the Internet. In some embodiments, the user device 1002 may be a wearable device. In some embodiments, the user device 1002 may be a smart phone, personal digital assistant (PDA), laptop computer, and/or other types of computing devices.

The user device 1002 may include one or more browser applications which may be used, for example, to provide a convenient interface to permit the customer to browse information available over the network 1010. For example, in one embodiment, the browser application may be implemented as a web browser configured to view information available over the Internet.

The user device 1002 may also include one or more toolbar applications which may be used, for example, to provide user-side processing for performing desired tasks in response to operations selected by the customer. In one embodiment, the toolbar application may display a user interface in connection with the browser application.

The user device 1002 may further include other applications as may be desired in particular embodiments to provide desired features to the user device 1002. In particular, the other applications may include a location-based device and payment management application provided by a system provider through the system provider device 1006. The other applications may also include security applications for implementing user-side security features, programmatic user applications for interfacing with appropriate application programming interfaces (APIs) over the network 1010, or other types of applications. Email and/or text applications may also be included, which allow the user to send and receive emails and/or text messages through the network 1010. The user device 1002 includes one or more user and/or device identifiers which may be implemented, for example, as operating system registry entries, cookies associated with the browser application, identifiers associated with hardware of the user device 1002, or other appropriate identifiers, such as a phone number. In one embodiment, the user identifier may be used by the social network service provider device 1004, system provider device 1006, and/or the third party service provider device 1008 to associate the user with a particular account as further described herein.

Figure 11:
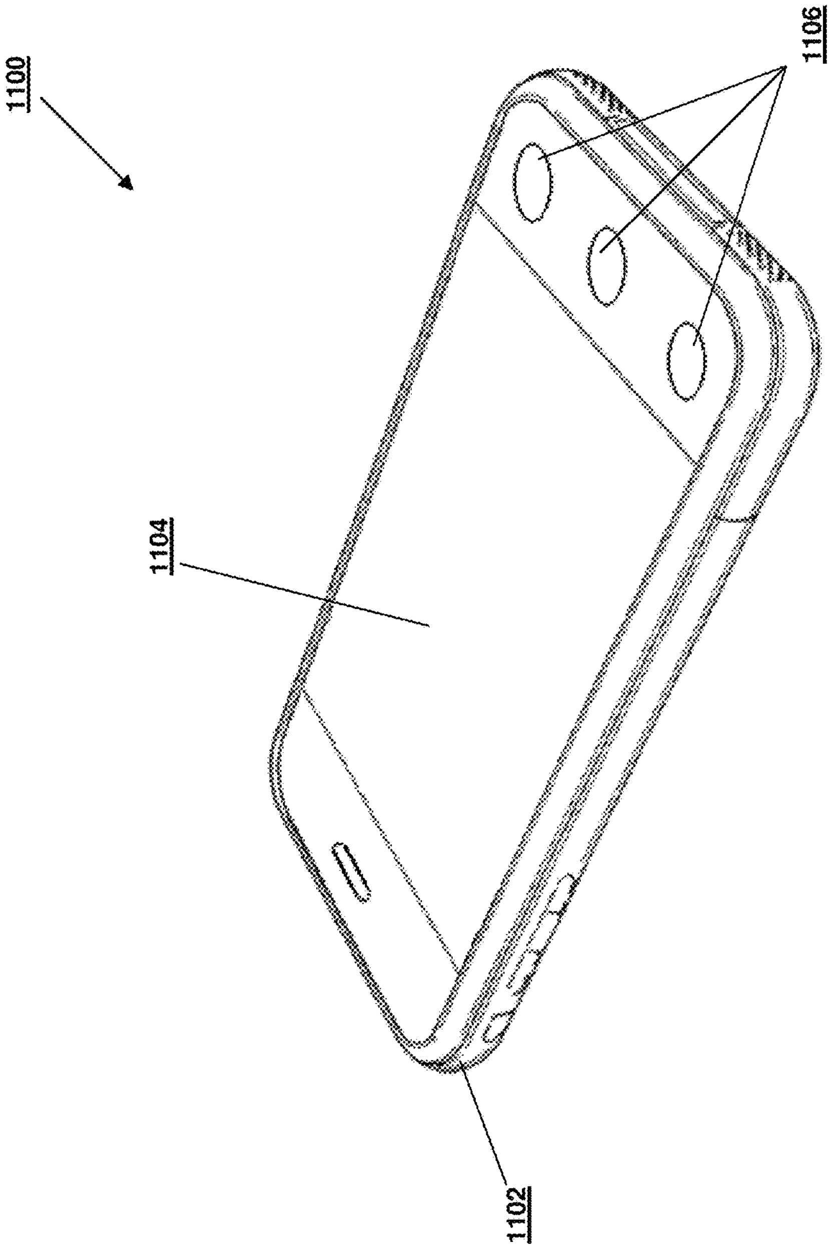
FIG. 11 is a perspective view illustrating an embodiment of a user device.

Referring now to FIG. 11, an embodiment of a user device 1100 is illustrated. The user device 1100 may be the user device 400. The user device 1100 includes a chassis 1102 having a display 1104 and an input device including the display 1104 and a plurality of input buttons 1106. One of skill in the art will recognize that the user device 1100 is a portable or mobile phone including a touch screen input device and a plurality of input buttons that allow the functionality discussed above with reference to the method 100. However, a variety of other portable/mobile customer devices may be used in the method 100 without departing from the scope of the present disclosure.

Figure 12:
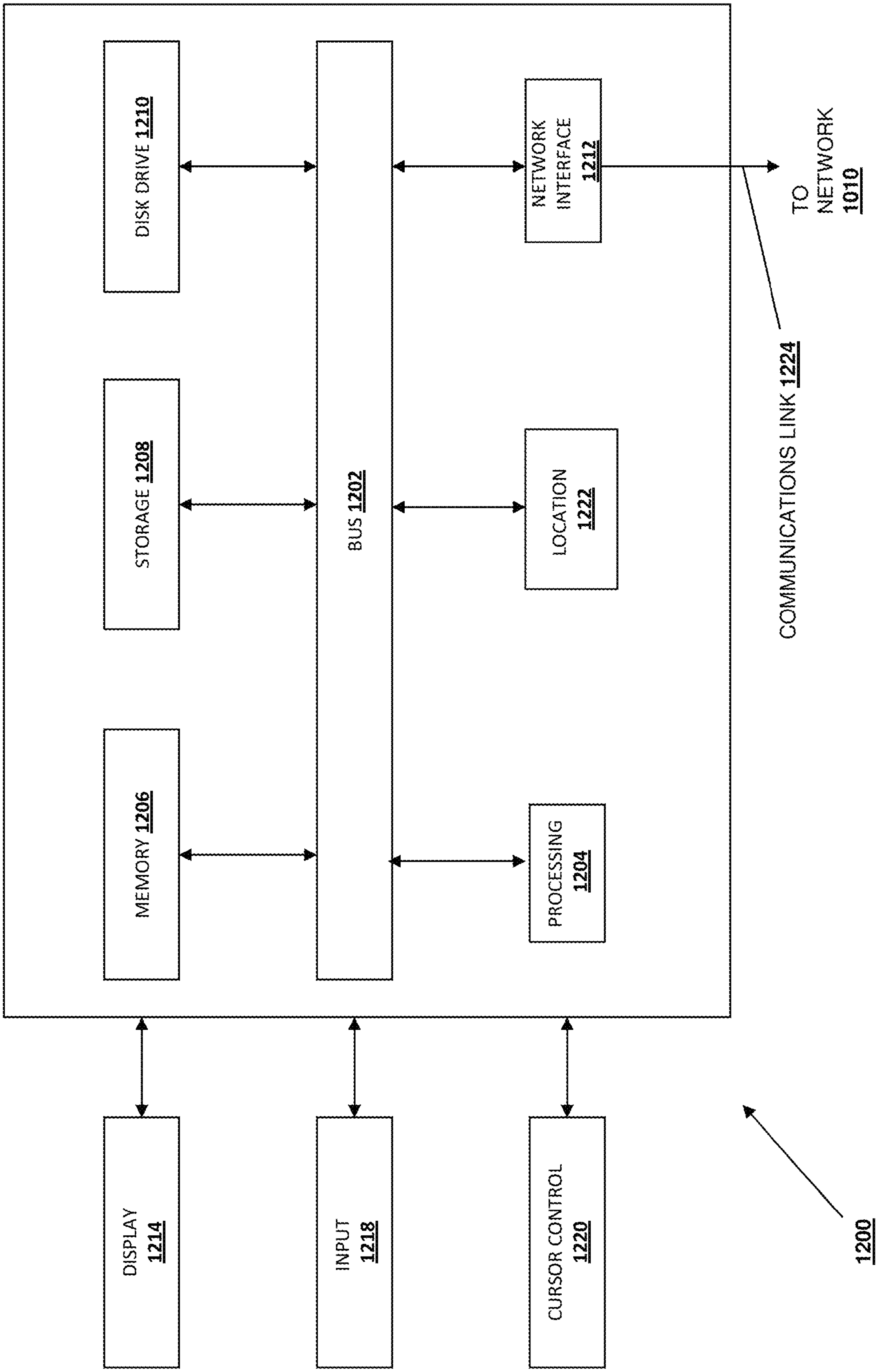
FIG. 12 is a schematic view illustrating an embodiment of a computer system.

Referring now to FIG. 12, an embodiment of a computer system 1200 suitable for implementing, for example, the system provider device 200, user device 400, user devices 1002, social network service provider devices 1004, system provider devices 1006, and third party service provider devices 1008, is illustrated. It should be appreciated that other devices utilized by users, payment service providers, other third party service providers, and/or system providers in the system discussed above may be implemented as the computer system 1200 in a manner as follows.

In accordance with various embodiments of the present disclosure, computer system 1200, such as a computer and/or a network server, includes a bus 1202 or other communication mechanism for communicating information, which interconnects subsystems and components, such as a processing component 1204 (e.g., processor, micro-controller, digital signal processor (DSP), etc.), a system memory component 1206 (e.g., RAM), a static storage component 1208 (e.g., ROM), a disk drive component 1210 (e.g., magnetic or optical), a network interface component 1212 (e.g., modem or Ethernet card), a display component 1214 (e.g., CRT or LCD), an input component 1218 (e.g., keyboard, keypad, or virtual keyboard), a cursor control component 1220 (e.g., mouse, pointer, or trackball), and a location sensor component 1222 (e.g., a Global Positioning System (GPS) device as illustrated, a cell tower triangulation device, and/or a variety of other location determination devices known in the art). In one implementation, the disk drive component 1210 may comprise a database having one or more disk drive components.

In accordance with embodiments of the present disclosure, the computer system 1200 performs specific operations by the processor 1204 executing one or more sequences of instructions contained in the memory component 1206, such as described herein with respect to the system provider device(s) 200, user device 400, user devices 1002, social network service provider devices 1004, system provider devices 1006, and third party service provider devices 1008. Such instructions may be read into the system memory component 1206 from another computer readable medium, such as the static storage component 1208 or the disk drive component 1210. In other embodiments, hard-wired circuitry may be used in place of or in combination with software instructions to implement the present disclosure.

Logic may be encoded in a computer readable medium, which may refer to any medium that participates in providing instructions to the processor 1204 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1210, volatile media includes dynamic memory, such as the system memory component 1206, and transmission media includes coaxial cables, copper wire, and fiber optics, including wires that comprise the bus 1202. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1200. In various other embodiments of the present disclosure, a plurality of the computer systems 1200 coupled by a communication link 1224 to the network 1010 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1200 may transmit and receive messages, data, information and instructions, including one or more programs (i.e., application code) through the communication link 1224 and the network interface component 1212. The network interface component 1212 may include an antenna, either separate or integrated, to enable transmission and reception via the communication link 1224. Received program code may be executed by processor 1204 as received and/or stored in disk drive component 1210 or some other non-volatile storage component for execution.

Figure 13:
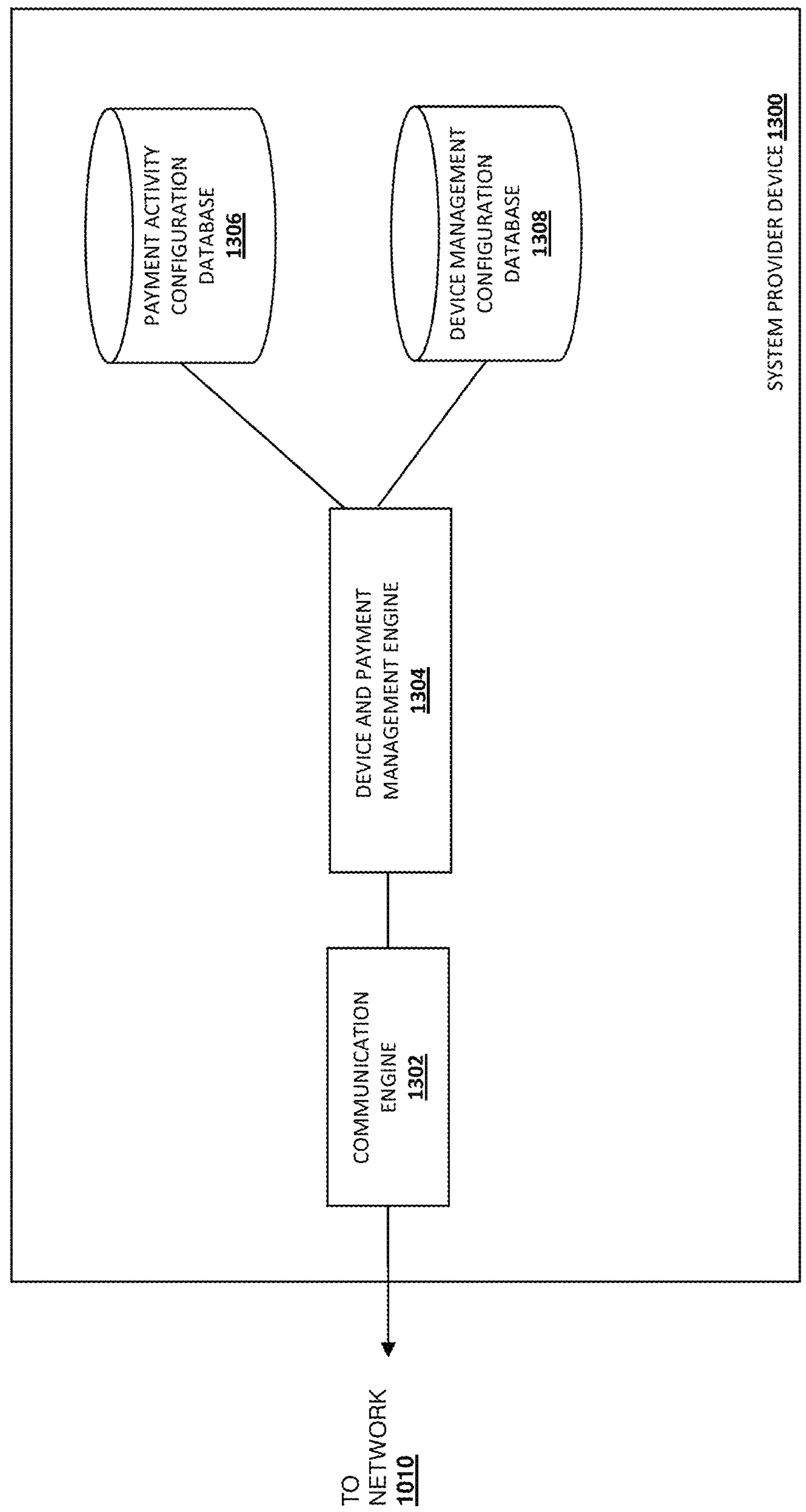
FIG. 13 is a schematic view illustrating an embodiment of a system provider device.

Referring now to FIG. 13, an embodiment of a system provider device 1300 is illustrated. In an embodiment, the system provider device 1300 may be the system provider devices 200 discussed above. The system provider device 1300 includes a communication engine 1302 that is coupled to the network 1010 and to a device and payment management engine 1304 that is coupled to a payment activity configuration database 1306 and a device management configuration database 1308. The communication engine 1302 may be software or instructions stored on a computer-readable medium that allows the system provider device 1300 to send and receive information over the network 1010. The device and payment management engine 1304 may be software or instructions stored on a computer-readable medium that is operable to receive body information from a user device associated with a user, determine a device management configuration associated with the body information, retrieve a user device management action using the device management configuration, and send to the user device, a notification associated with the user device management action that causes the user device to perform the user device management action, and provide any of the other functionality that is discussed above. While the databases 1306-1308 have been illustrated as separate from each other and located in the system provider device 1300, one of skill in the art will recognize that any or all of the databases 1306-1308 may be combined and/or may be connected to the device and payment management engine 1304 through the network 1010 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:

a non-transitory memory; and one or more hardware processors coupled to the non-transitory memory and configured to read instructions from the non-transitory memory to cause the system to perform operations comprising:

detecting, through a first network, that a user device that is associated with a user is located at a trusted location, the trusted location determined based on a geographic location of the user device and an identifier of the first network;

determining a first anticipated activity that is associated with the user, wherein the first anticipated activity identifies a first activity location that is an untrusted location different from the trusted location, and wherein a security setting of the first anticipated activity requires an authentication credential for the first anticipated activity at the trusted location prior to using a public network at the untrusted location;

retrieving a first device management configuration that is associated with the first anticipated activity;

determining, using the first device management configuration, a first user device action to be performed on the user device at the trusted location;

sending, through the first network to the user device, a first notification requesting the authentication credential through the user device based on the first user device action;

receiving, from the user device, the authentication credential;

authenticating, through the user device, the first anticipated activity at the trusted location based on the authentication credential;

determining the user device is located at the first activity location;

based on determining the user device is located at the first activity location and performance of the first user device action, determining that the first anticipated activity has been authenticated at the trusted location; and performing a second user device action related to the first anticipated activity without requesting the authentication credential of the first anticipated activity with the system over the public network at the first activity location.

2. The system of claim 1, wherein:

the first user device action comprises transferring, through the first network, content to the user device, wherein the content is identified, at least in part, by the first anticipated activity.

3. The system of claim 1, wherein the performing the second user device action comprises:

receiving, from the user device that is located at the trusted location, a payment request; and processing the payment request according to the first anticipated activity and the authentication credential.

4. The system of claim 3, wherein the operations further comprise:

in response to the authenticating, storing the authentication credential for the authentication that is configured to authenticate the user with a payment service provider associated with the first anticipated activity.

5. The system of claim 4, wherein the processing the payment request comprises:

determining that the payment request is preapproved;

retrieving the authentication credential; and sending the authentication credential to the payment service provider to complete a payment transaction that is identified by the payment request.

6. The system of claim 5, wherein the determining that the payment request is preapproved comprises:

authenticating the second user device action by detecting that a wearable user device that is associated with the user is located at the trusted location.

7. The system of claim 3, wherein the operations further comprise:

authenticating the second user device action by detecting that a wearable user device that is associated with the user is located at the trusted location.

8. A method, comprising:

detecting, by a system provider device through a first network, that a user device that is associated with a user is located at a trusted location, the trusted location determined based on a geographic location and a network identifier;

determining, by the system provider device, a first anticipated activity that is associated with the user, wherein the first anticipated activity identifies a first activity location that is an untrusted location different from the trusted location, and wherein a security setting of the first anticipated activity requires an authentication credential for the first anticipated activity at the trusted location prior to using a public network at the untrusted location;

retrieving, by the system provider device, a first device management configuration that is associated with the first anticipated activity;

determining, by the system provider device using the first device management configuration, a first user device action to be performed on the user device at the trusted location;

sending, by the system provider device through the first network to the user device, a first notification requesting the authentication credential through the user device based on the first user device action;

receiving, from the user device, the authentication credential;

authenticating, through the user device, the first anticipated activity at the trusted location based on the authentication credential;

determining the user device is located at the first activity location;

based on determining the user device is located at the first activity location and performance of the first user device action activity, determining that the first anticipated activity has been authenticated at the trusted location; and performing a second user device action related to the first anticipated activity without requesting the authentication credential of the first anticipated activity with the service provider device over the public network at the first activity location.

9. The method of claim 8, wherein the first user device action comprises transferring, through the first network, content to the user device, wherein the content is identified, at least in part, by the first anticipated activity.

10. The method of claim 8, wherein the performing the second user device action comprises:

receiving, by the system provider device through a second network from the user device that is located at the trusted location, a payment request; and processing, by the system provider device, the payment request according to the first anticipated activity and the authentication credential.

11. The method of claim 10, further comprising:

in response to the authenticating, storing, by the system provider device in a memory, the authentication credential for the authentication that is configured to authenticate the user with a payment service provider associated with the first anticipated activity.

12. The method of claim 11, wherein the processing the payment request comprises:

determining, by the system provider device, that the payment request is preapproved;

retrieving, by the system provider device from the memory, the authentication credential; and sending, by the system provider device, the authentication credential to the payment service provider to complete a payment transaction that is identified by the payment request.

13. The method of claim 12, wherein the determining that the payment request is preapproved comprises:

authenticating, by the system provider device, the payment request by detecting, through the second network, the second user device action by detecting, through the second network, that a wearable user device that is associated with the user is located at the trusted location.

14. The method of claim 10, further comprising:

authenticating, by the system provider device, the second user device action by detecting that a wearable user device that is associated with the user is located at the trusted location.

15. A non-transitory machine-readable medium having stored thereon machine-readable instructions executable to cause a machine to perform operations comprising:

detecting, by a system provider device through a network, that a user device that is associated with a user is located at a trusted location;

determining, by the system provider device, a first anticipated activity that is associated with the user, wherein the first anticipated activity identifies a first activity location that is an untrusted location different from the trusted location, the trusted location determined based on a geographic location and a network identifier, and wherein a security setting of the first anticipated activity requires an authentication credential for the first anticipated activity at the trusted location prior to using a public network at the untrusted location;

retrieving, by the system provider device, a first device management configuration that is associated with the first anticipated activity;

determining, by the system provider device using the first device management configuration, a first user device action to be performed on the user device at the trusted location;

requesting the authentication credential through the user device based on the first user device action;

receiving, from the user device, the authentication credential;

authenticating, through the user device, the first anticipated activity at the trusted location based on the authentication credential;

sending, by the system provider device through the network to the user device, a first notification that causes the first user device action to be performed on the user device while the user device remains at the trusted location;

determining the user device is located at the first activity location;

based on determining the user device is located at the first activity location and a performance of the first user device action, determining that the first anticipated activity has been authenticated at the trusted location; and performing a second user device action related to the first anticipated activity without requesting the authentication credential of the first anticipated activity with the service provider device over the public network at the first activity location.

16. The non-transitory machine-readable medium of claim 15, wherein the first user device action comprises transferring, through the network, content to the user device, wherein the content is identified, at least in part, by the first anticipated activity.

17. The non-transitory machine-readable medium of claim 16, wherein the performing the second user device action comprises:

receiving, by the system provider device from the user device that is located at the trusted location, a payment request; and processing, by the system provider device, the payment request according to the first anticipated activity and the authentication credential.

18. The non-transitory machine-readable medium of claim 17, wherein the operations further comprise:

in response to the authenticating, storing, by the system provider device in a memory, the authentication credential for the authentication that is configured to authenticate the user with a payment service provider associated with the first anticipated activity.

19. The non-transitory machine-readable medium of claim 18, wherein the processing the payment request comprises:

determining, by the system provider device, that the payment request is preapproved;

retrieving, by the system provider device from the memory, the authentication credential; and sending, by the system provider device, the authentication credential to the payment service provider to complete a payment transaction that is identified by the payment request.

20. The non-transitory machine-readable medium of claim 19, wherein the determining that the payment request is preapproved comprises:

authenticating, by the system provider device, the second user device action by detecting that a wearable user device that is associated with the user is located at the trusted location.

* * * * *

UNITED STATES PATENT AND TRADEMARK OFFICE

CERTIFICATE OF CORRECTION

PATENT NO. : 10,810,571 B2
APPLICATION NO. : 15/292952
DATED : October 20, 2020
INVENTOR(S) : Michael Charles Todasco and Cheng Tian It is certified that error appears in the above-identified patent and that said Letters Patent is hereby corrected as shown below:

In the Claims

In Column 19, Claim 8, Line 51 change “device action activity” to --device action--

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*